(12) United States Patent
Eveker et al.

(10) Patent No.: US 6,877,695 B2
(45) Date of Patent: Apr. 12, 2005

(54) HINGE COVER INTEGRATION INTO DOOR SEAL EDGES

(75) Inventors: James V. Eveker, St. Lous, MO (US); Roger K. Young, Florissant, MO (US)

(73) Assignee: The Boeing Company, Chicago, IL (US)

(*) Notice: Subject to any disclaimer, the term of this patent is extended or adjusted under 35 U.S.C. 154(b) by 11 days.

(21) Appl. No.: 10/318,439

(22) Filed: Dec. 13, 2002

(65) Prior Publication Data

US 2004/0113016 A1 Jun. 17, 2004

(51) Int. Cl.[7] .................................................. B64C 1/14
(52) U.S. Cl. ..................... 244/129.5; 244/131; 49/475.1
(58) Field of Search ............................ 244/129.4, 129.5, 244/131; 49/91.1, 383, 475.1, 47, 479.1; 277/921

(56) References Cited

U.S. PATENT DOCUMENTS

| | | | |
|---|---|---|---|
| 3,602,405 A | * | 8/1971 | Ames .......................... 222/386 |
| 3,791,074 A | * | 2/1974 | Wafffenschmidt ............. 49/399 |
| 3,954,296 A | * | 5/1976 | Patnode ......................... 296/10 |
| 4,991,349 A | * | 2/1991 | Barthelemy ..................... 49/61 |
| 5,303,508 A | * | 4/1994 | Porte ............................. 49/109 |
| 5,540,404 A | * | 7/1996 | Battenfield ................ 244/129.5 |
| 5,746,466 A | * | 5/1998 | Antos et al. ................. 296/37.1 |
| 5,810,291 A | | 9/1998 | Geiger et al. |
| 5,913,494 A | | 6/1999 | Burbridge et al. |
| 5,918,834 A | | 7/1999 | Sommer et al. |
| 5,927,651 A | | 7/1999 | Geders et al. |
| 5,931,422 A | | 8/1999 | Geiger et al. |
| 5,941,480 A | | 8/1999 | Wille |
| 5,947,417 A | | 9/1999 | Cameron |
| 5,947,422 A | | 9/1999 | Wille |
| 5,958,803 A | | 9/1999 | Geiger |
| 5,975,463 A | | 11/1999 | Gruensfelder et al. |
| 5,979,828 A | | 11/1999 | Gruensfelder et al. |
| 5,988,567 A | | 11/1999 | Wille |
| 6,027,074 A | | 2/2000 | Cameron et al. |
| 6,048,581 A | | 4/2000 | Waldrop, III |
| 6,068,215 A | | 5/2000 | Gruensfelder et al. |
| 6,076,766 A | | 6/2000 | Gruensfelder |
| 6,079,667 A | | 6/2000 | Gruensfelder |
| 6,089,505 A | | 7/2000 | Gruensfelder et al. |
| 6,092,764 A | | 7/2000 | Geders et al. |
| 6,170,781 B1 | * | 1/2001 | Sherrill et al. ............ 244/129.5 |
| 6,209,824 B1 | | 4/2001 | Caton et al. |
| 6,213,433 B1 | | 4/2001 | Gruensfelder et al. |
| 6,231,006 B1 | | 5/2001 | Gruensfelder et al. |
| 6,260,567 B1 | | 7/2001 | Gruensfelder et al. |
| 6,276,026 B1 | | 8/2001 | Wille |
| 6,312,043 B1 | * | 11/2001 | Blackburn et al. ...... 296/146.16 |
| 6,375,122 B1 | | 4/2002 | Cameron et al. |

FOREIGN PATENT DOCUMENTS

| | | | |
|---|---|---|---|
| DE | 29713540 U1 | * 9/1997 | ............. E05D/1/02 |

* cited by examiner

Primary Examiner—Michael J. Carone
Assistant Examiner—Daniel Matz
(74) Attorney, Agent, or Firm—Shimokaji & Associates, P.C.

(57) ABSTRACT

An aircraft door includes a seal that integrates a flexible silicone seal portion and a rigid blade seal portion into a single continuous seal around the mold line gap between the door and frame. The arrangement allows for the use of space saving piano hinges to mount the door. The seal includes a rigid blade seal around three edges of the door and a flexible hinge cover seal adjacent to the hinge edge of the door. The flexible hinge cover seal is bonded to terminal blocks which in turn can be mounted to the door edge and to the door frame such that the flexible hinge cover seal covers the mold line gap adjacent to the hinge.

24 Claims, 5 Drawing Sheets

HINGE COVER INTEGRATION INTO DOOR SEAL EDGES

BACKGROUND OF THE INVENTION

The present invention generally relates to apparatus and methods for aircraft door seals and, more particularly, to apparatus and methods for aircraft door seals using piano type hinges.

It is necessary to seal aircraft doors including those required in-flight operation such as weapons bay doors. Mold line gaps around in-flight operable doors create drag, turbulent flow and sealing problems for aircraft. Compounding the problem there is limited space within a fighter aircraft for the door hinge mechanism. This places a limit on the choice of hinge mechanism and some of the easier to seal hinge mechanisms require maximum space from the bays they are adjacent to. For example, a piano hinge mechanism is the simplest hinge that requires the least amount of space. But the piano hinge requires a hinge cover seal capable of adapting to a door hinge edge travel that requires a longer seal at door closure then when the door is open. As the piano hinged door closes, the hinge cover seal must be able to compensate for the increasing distance between the hinge edge of the door and the door frame. See FIG. 3 for door open and FIG. 4 for closed. This typically results in a complicated, bulky seal or a seal that does not cover the mold line gaps on the hinge side of the door.

One prior art solution uses metal or composite blade seals around the entire door requiring 'goose neck hinges', see prior art FIG. 5, to prevent the blade seal adjacent the hinge side of the door from contacting aircraft mold line in the door open position. However, the goose neck hinges require a substantially greater volume than a piano hinge because the hinge linkage are bulky. This takes up valuable space in one or more bays of the aircraft.

Another approach uses the so-called '6 bar linkage' hinge, which again simplifies the problem of sealing by maintaining a relatively constant distance between the door frame and the hinge sealing edge of the door. This simplifies the seal because the hinge cover seal does not need to stretch, just bend, but again this results in a bulkier and more complicated hinge that takes more space from the bays adjacent to it. The '6 bar linkage' hinge and goose neck hinge also place moving links in the bay that must be accounted for in designing the use of the bay.

As can be seen, there is a need for an aircraft door seal that allows for effective sealing around the hinge side of the door and door frame. There is a need for a seal that can be employed with a simple piano hinge mechanism to reduce mechanical protrusions into the bay space of the aircraft. Moreover, there is a need for efficient seal that can be used with aircraft doors including those that are operational in-flight such as weapons bay doors.

SUMMARY OF THE INVENTION

The present invention provides a flexible hinge cover seal that will stretch to cover a piano hinge as the door is closed. The present invention also provides a method of installing a flexible hinge cover seal adjacent to in-flight operable doors of an aircraft. Moreover, the present invention provides a flexible hinge cover seal that works in conjunction with existing blade seal technology.

In one aspect of the present invention, a flexible, silicon based hinge cover seal is used to partially cover the gap between the edge of an aircraft door and the door frame. The three door edges away from the hinge are covered by conventional blade seals adapted to blend with the flexible hinge cover seal on the hinge edge of the door.

In another aspect of the present invention, a flexible hinge cover seal is molded into terminal blocks. In the heated molding process the hinge cover seal becomes bonded to the terminal blocks which are later attached to the aircraft. One terminal block is mounted to the door and the other adjacent to it on the door frame. The spacing is such that when the door is open the flexible hinge cover seal can be bent and installed in an unstressed configuration. Then upon closing the door the flexible hinge cover seal is stretched to cover the hinge and door gap adjacent to the hinge.

In still another aspect of the present invention, the flexible hinge cover seal flexes from a relatively flat orientation when the door is closed into a bent configuration when the door is open. The bent configuration of the flexible seal, when the door is open, includes an 'S' shaped flap of material near each end of the flexible hinge cover seal and adjacent to the front & back door seal edges near the hinge. It is this 'S' shaped flap that allows for the integration of the ridged blade seals into the flexible hinge cover seal to provide a continuous seal around the door edge.

In yet another aspect of the present invention, a space efficient piano hinge is used in combination with a flexible hinge cover seal to seal an aircraft door. The arrangement provides superior sealing while using a minimum of payload space within the aircraft.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a flexible hinge cover seal that allows for the use of piano hinges with in-flight operable doors when aircraft volume is limited and elimination of aircraft surface gaps is paramount. Piano hinges collapse to a flat orientation that takes up almost no space when a door is closed. This space saving aspect of the piano hinge is very desirable in aircraft as space and payload are always at a premium. In addition to space savings, the piano hinge is simple having only one moving part. While these desirable aspects of piano hinges are well known, the use of piano hinges in the prior art has made it very difficult to seal aircraft doors. As a result other, more complex door hinges have been employed, because they are easier to seal.

The present invention provides for a flexible hinge cover seal that has the ability to flex, bend and stretch. This flexible hinge cover seal is used in conjunction with prior art blade seals to provide an integrated door seal around a door using a space efficient piano hinge.

Figure 1:
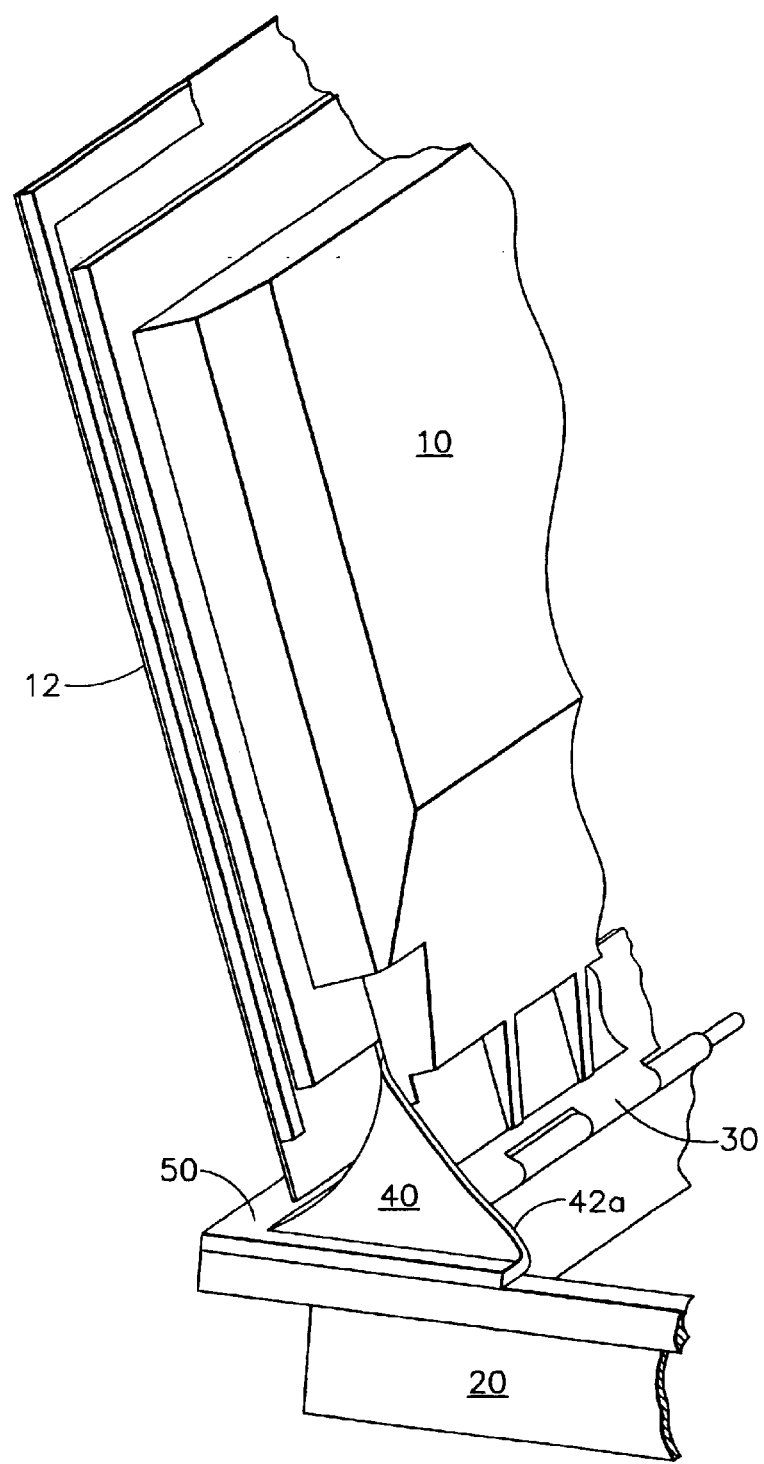
FIG. 1 is a perspective view of a weapons bay door in an open position using the present invention.

Referring now to FIG. 1, the door panel 10 may be attached to the aircraft door frame 20 by a piano hinge 30. A flexible hinge cover seal 40 may be attached to the aircraft door frame 20 through terminal block 50. The aircraft door panel 10 may include a rigid blade seal 12 around three sides of the door. The rigid blade seal 12 may be formed from metal or composite material for example titanium or graphite composite. The terminal block 50 may be made from any suitable material such as aluminum.

The flexible hinge cover seal 40 may be molded as a thin, flexible silicon based sheet. It is molded directly into the terminal block 50 and may bond to the terminal block 50 during the molding step. The molding process uses a vacuum cure sequence similar to curing sequence used for carbon epoxy laminar ply layup curing. As can be seen in FIG. 1 the flexible hinge cover seal 40 may be flexible and may bend as the door 10 is opened, see also FIG. 3 for bending. The seal edge 42 near the door panel 10 may flex into an 'S' shape as the door is opened this is shown for one end of the door panel 10 but happens at the other end of the door panel 10 as well.

Figure 2:
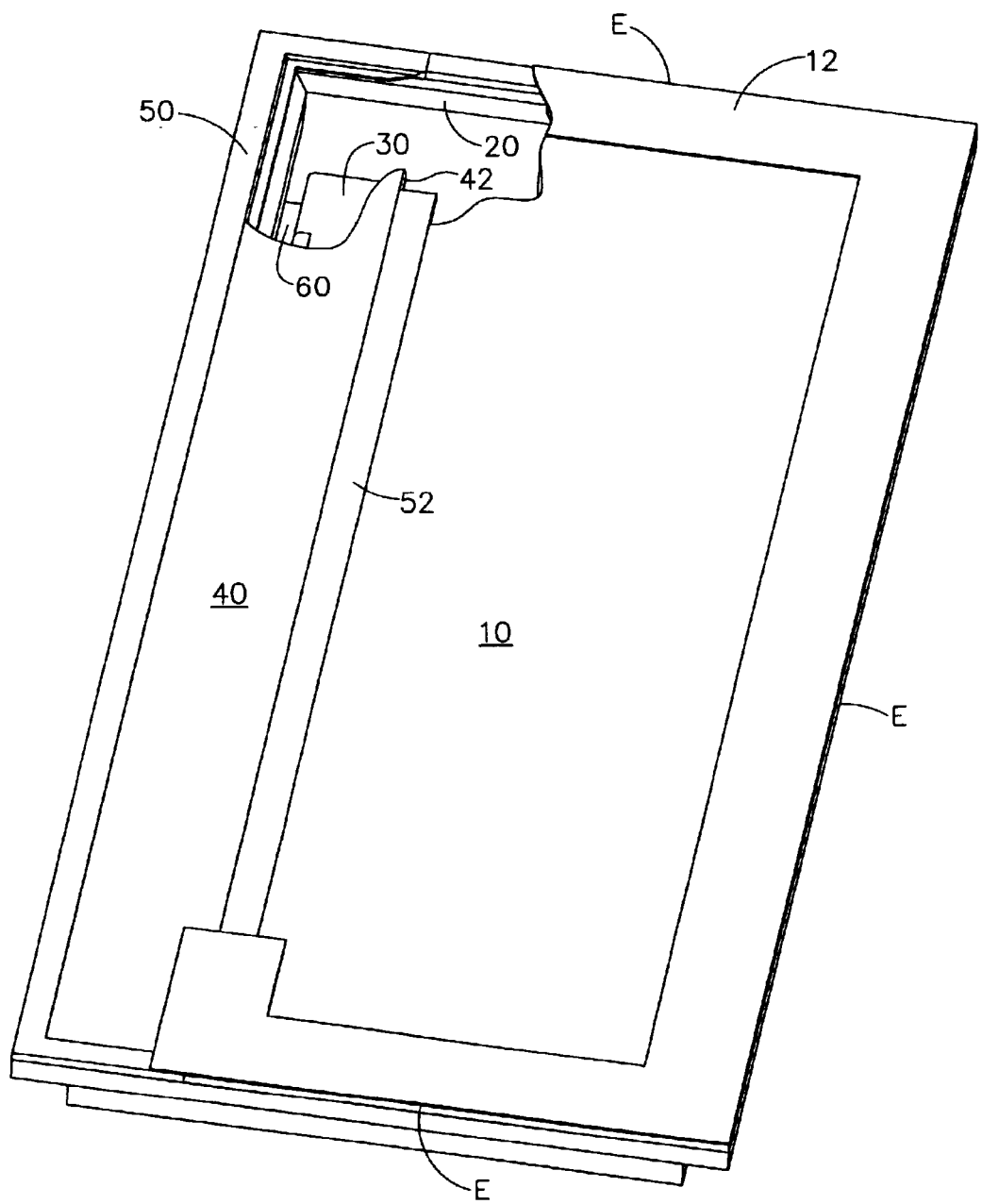
FIG. 2 is a perspective view of a weapons bay door in a closed position using the present invention.

FIG. 2 shows the door panel 10 in the closed position. FIG. 2 shows a partial cut away. This view shows that the door panel 10 may also include a terminal block 52. During its manufacture the flexible hinge cover seal 40 may be molded and bonded to both terminal blocks 50 and 52 which may be used to attach it the door panel 10 and frame 20. The flexible hinge cover seal 40 may be formed by molding silicon based material into the terminal blocks 50 and 52. Heating the silicon material may allow it to form a bond with the terminal blocks 50 and 52. As shown in the cutaway, the blade seal 12, cutaway at top, may overlap the seal edge 42 between the terminal block 50 and the terminal block 52 mounted to the door panel 10. The location of gap 60 between the door panel 10, hinge 30 is shown where the door panel 10 and blade seal 12 are partially cut away. The gap 60 is also shown in FIG. 4.

As can be seen referring to FIG. 2, the blade seal 12 may seal the edges 'E' of the door panel 10 away from the hinge 30 and the blade seal 12 may lay over the top of the flexible hinge cover seal 40 to blend to a continuous sealing around the door panel 10. As can also be seen in FIG. 2, with a portion of the blade seal 12 cut away, the flexible hinge cover seal 40 has now flexed into a flat and stretched orientation and the seal edge 42 may now lie flat. The seal edge 42 of the flexible hinge cover seal 40 that may lie between the terminal block 50 and the terminal block 52 is the portion that forms the 'S' as shown in FIG. 1, when the door panel 10 is open.

Figure 3:
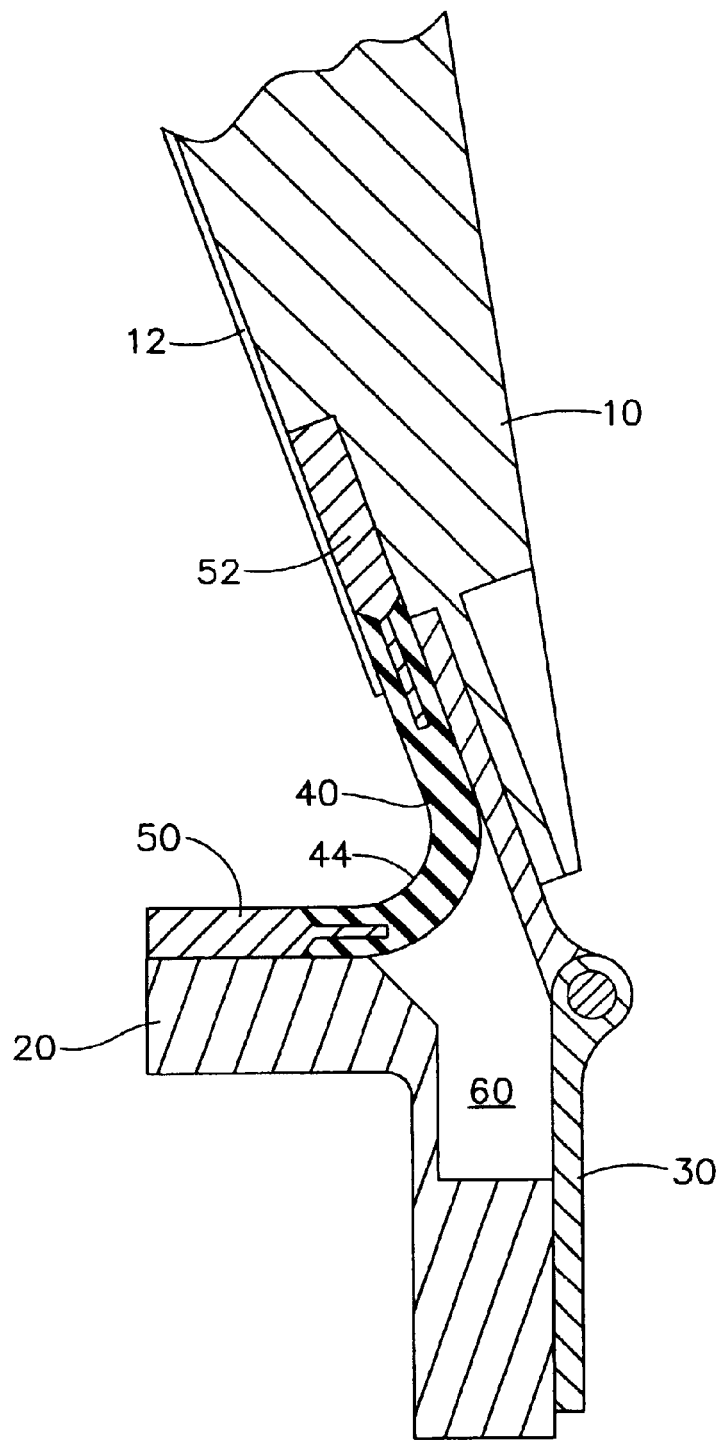
FIG. 3 shows a partial cross sectional view of the open weapons bay door of FIG. 1.

FIG. 3 shows a cross sectional view of the hinge and seal arrangement with the door panel 10 in its open position, supported by piano hinge 30. The blade seal 12 may overlap the terminal block 52 and a portion of flexible hinge cover seal 40. In the open position of the door panel 10, most of the flexible hinge cover seal 40 may be bent in a sweeping bend 44 between the terminal blocks 50 and 52. The seal edge 'S' shape 42a may only occur at the ends as shown in FIG. 1 when the door panel 10 is open.

Figure 4:
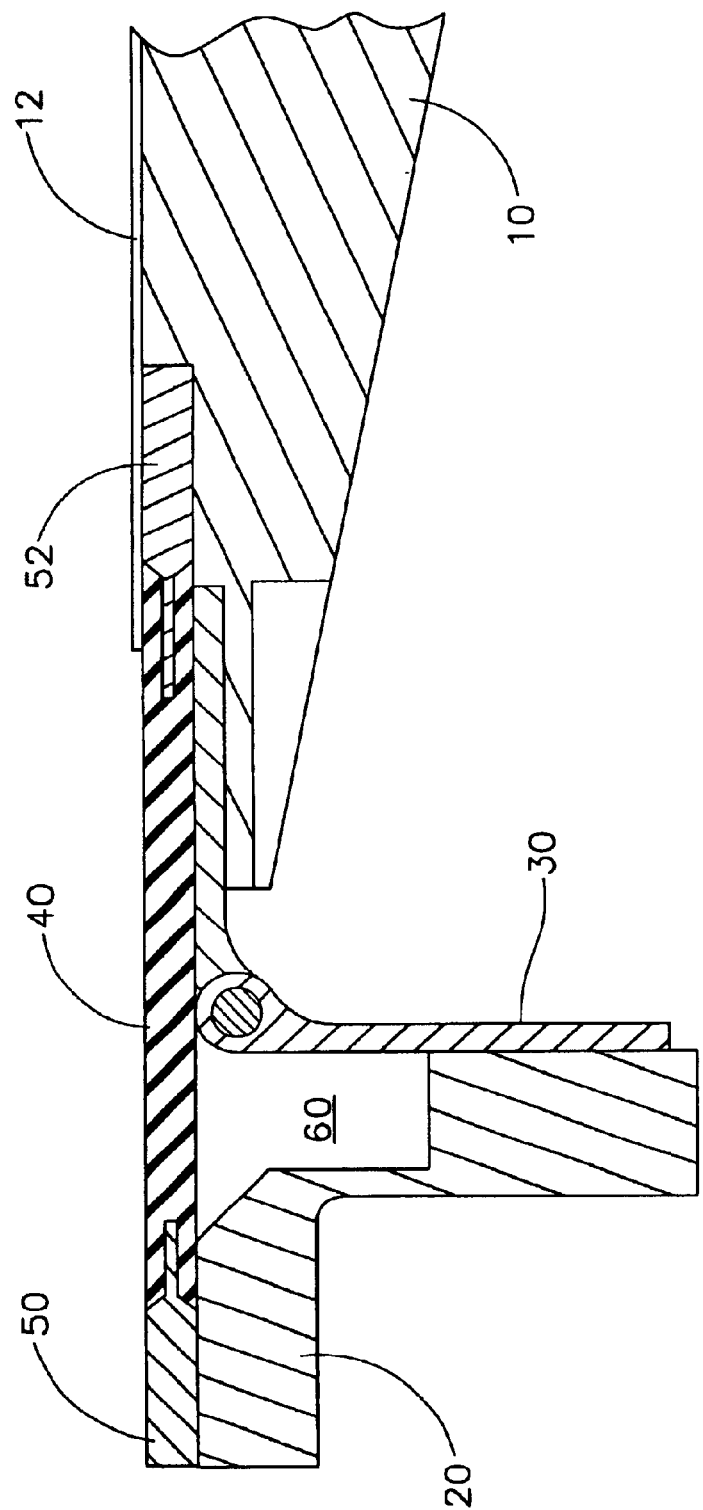
FIG. 4 shows a partial cross sectional view of the closed weapons bay door of FIG. 2.

Referring now to cross section view FIG. 4, the door panel 10 is in the closed position. The flexible hinge cover seal 40 is stretched out flat. Again the blade seal 12 may overlay the flexible hinge cover seal 40 near the corner of the door panel 10. The flexible hinge cover seal 40 and blade seal 12 [may] cooperate to form a continuous seal around the door panel 10.

Figure 5:
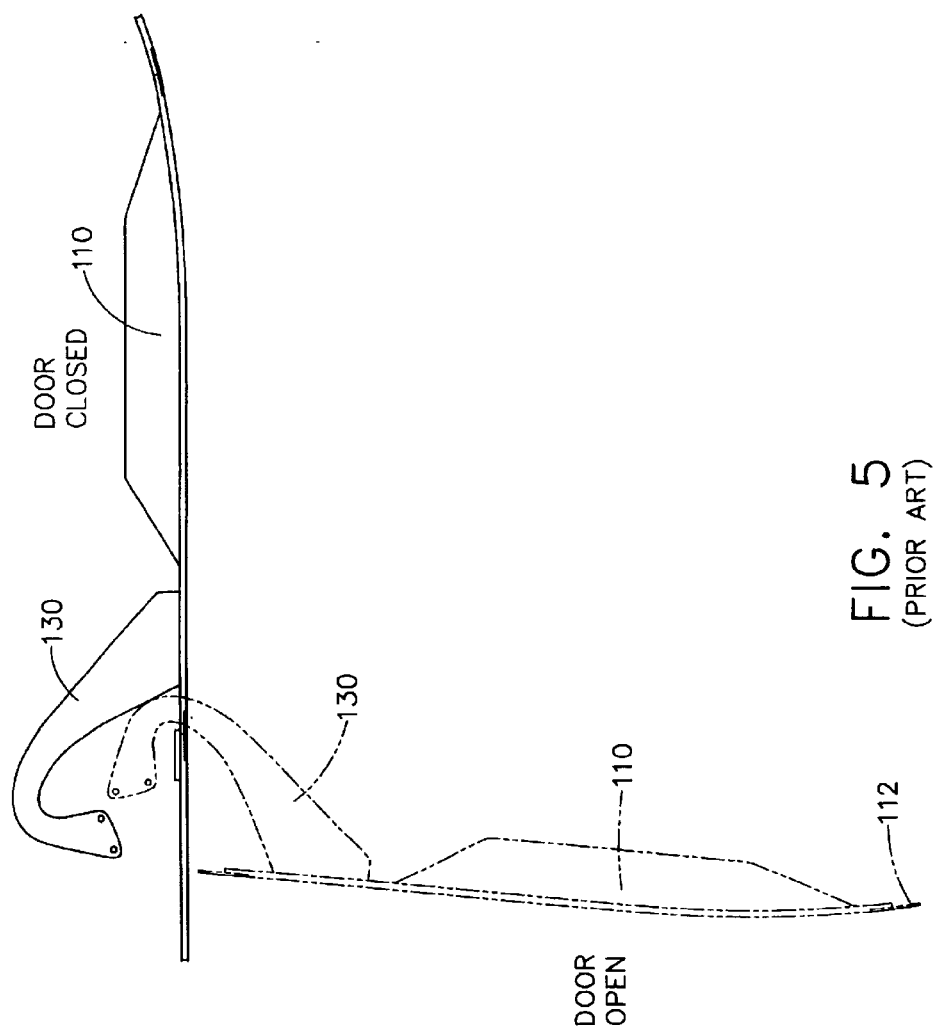
FIG. 5 shows a prior art door and seal.

FIG. 5 shows one prior art sealing arrangement. A goose neck hinge 130 operates a door panel 10. This arrangement will operate in such a way that when the door panel 110 opens, the blade seal 112 around the door panel 110 will not hit the body of the aircraft 101. This arrangement works well but requires a hinge 130 that takes up a lot of space surrounding the door 110.

Referring again to FIGS. 1 and 2, the flexible hinge cover seal 40 may be formed and bonded to the terminal blocks 50 and 52. Once formed and with the door panel 10 in the open position, terminal block 50 may be attached to the aircraft door frame 20. The flexible hinge cover seal 40 may then be bent, see FIG. 3, such that terminal block 52 may be attached to the door panel 10 adjacent to the hinge 30. Once the flexible hinge cover seal 40 is attached to the frame 20 and door panel 10, dosing the door panel 10 may cause the flexible hinge cover seal 40 to stretch over the gap 60 shown in FIG. 4.

It should be understood, of course, that the foregoing relates to a preferred embodiment of the invention and that modifications may be made without departing from the spirit and scope of the invention as set forth in the following claims.

We claim:

1. An aircraft door and seal combination comprising;
    a piano hinge attaching said aircraft door to a frame with a gap between said aircraft door and said frame when said aircraft door is in a closed position;
    a blade seal attached to an edge of said aircraft door;
    a first terminal block attached to said aircraft door adjacent to said piano hinge;
    a flexible seal bonded to said first terminal block;
    a second terminal block attached to said frame and said flexible seal bonded to said second terminal block such that said flexible seal covers a portion of said gap.

2. The aircraft door and seal combination of claim 1 wherein;
    said flexible seal is made in part from silicon.

3. The aircraft door and seal combination of claim 1, wherein;
    said blade seal covers a portion of said gap and wherein said blade seal covers a portion of said flexible seal adjacent to said piano hinge to form a continuous seal over said gap.

4. The aircraft door and seal combination of claim 1, wherein said flexible seal is stretched in a generally flat orientation when said door is in said closed position.

5. The aircraft door and seal assembly of claim 4, wherein said door includes an open position and wherein said flexible seal flexes to a non-flat orientation when said door is in said open position.

6. An aircraft door comprising;
    a door panel having four generally linear edges;
    a piano hinge attaching said door panel to a door frame with a gap between each of said four generally linear edges and said door frame when said aircraft door is in a closed position;
    a blade seal attached to three of said four linear edges of said door panel;
    a first terminal block attached to said door panel on the fourth linear edge;

a flexible seal bonded to said first terminal block;

a second terminal block attached to said frame and said flexible seal bonded to said second terminal block such that said flexible seal covers a portion of said gap adjacent to said fourth linear edge.

7. The aircraft door of claim 6 wherein;

said blade seal overlaps a portion of said flexible seal adjacent to said piano hinge.

8. The aircraft door of claim 6, wherein;

said flexible seal is generally flat when said aircraft door is in said closed position and wherein said aircraft door includes an open position, and when said aircraft door is in said open position said flexible seal is in a bent orientation.

9. The aircraft door of claim 8, wherein;

when said aircraft door is open and said flexible seal is in said bent orientation, a portion of said flexible seal assumes an 'S' shape.

10. An aircraft door and frame combination comprising;

a piano hinge attaching said aircraft door to said frame with a gap between said aircraft door and said frame when said aircraft door is in a closed position;

a blade seal attached to a first edge of said aircraft door;

a flexible seal bonded to a second edge of said door;

said flexible seal also bonded to a portion of said frame such that said flexible seal covers a portion of said gap, said blade seal lying on one side of said aircraft door.

11. An aircraft door and frame combination comprising;

a piano hinge attaching said aircraft door to said frame with a gap between said aircraft door and said frame when said aircraft door is in a closed position;

a blade seal attached to a first edge of said aircraft door;

a flexible seal bonded to a second edge of said door;

said flexible seal also bonded to a portion of said frame such that said flexible seal covers a portion of said gap, wherein said second edge of said door includes a terminal block and, wherein said flexible seal is bonded to said terminal block.

12. The aircraft door and frame combination of claim 11, wherein;

said terminal block is a flat titanium plate attachable to said door.

13. An aircraft door and frame combination comprising;

a piano hinge attaching said aircraft door to said frame with a gap between said aircraft door and said frame when said aircraft door is in a closed position;

a blade seal attached to a first edge of said aircraft door;

a flexible seal bonded to a second edge of said door;

said flexible seal also bonded to a portion of said frame such that said flexible seal covers a portion of said gap, wherein said portion of said frame includes an titanium terminal block to which the flexible seal is bonded.

14. An aircraft door and aircraft frame combination comprising;

an aircraft door panel having an open position and a closed position;

a hinge movably mounting said door panel to said aircraft frame;

a gap between said aircraft door panel and said aircraft frame;

a flexible seal having a length and wherein said flexible seal is attached to said air frame and to said door panel such that the flexible seal covers the gap and such that in said open position of said door, said flexible seal is bent into a radius along a portion of its length and in said closed position said flexible seal is generally flat and flush with an outer surface of said aircraft frame.

15. The aircraft door and aircraft frame combination of claim 14, wherein when said door is in said closed position said seal is stretched.

16. The aircraft door and aircraft frame combination of claim 14, wherein said hinge is a piano hinge.

17. A door and frame combination comprising;

a door panel having an open position and a closed position;

a hinge movably mounting said door panel to said frame;

a gap between said door panel and said frame;

a flexible seal having a length and wherein said flexible seal is attached to an edge of said frame and to an edge of said door panel such that the flexible seal covers the gap and such that in said open position of said door, said flexible seal is bent into a radius along a portion of its length and in said closed position said flexible seal is stretched and is generally flat.

18. The door and frame combination of claim 17, wherein;

said hinge is a piano hinge.

19. A method of assembling an aircraft door and door seal comprising steps of;

attaching a door panel to a door frame using a piano hinge such that said door frame surrounds said door panel with a gap between said door frame and said door panel;

forming a flat flexible seal;

bonding a first edge of said flexible seal to a first rigid terminal block;

bonding a second edge of said flexible seal to a second rigid terminal block;

placing said door in an open position;

bending said flexible seal;

attaching said flexible seal to said door frame and attaching said flexible seal to said door panel such that said flexible seal covers a portion of said gap.

20. The method of claim 19, wherein;

said step of attaching said flexible seal to said door frame includes the step of attaching said first rigid terminal block to said door frame.

21. The method of claim 19, wherein;

said step of attaching said flexible seal to said door panel includes the step of attaching said second rigid terminal block to said door panel.

22. The method of claim 19 further comprising;

a step of attaching a rigid blade seal to an edge of said door panel and;

overlapping a portion of said flexible seal with a portion of said rigid blade seal to form a continuous cover over said gap.

23. A method of assembling an aircraft door and door seal comprising steps of;

attaching a door panel to a door frame using a piano hinge such that said door frame surrounds said door panel with a gap between said door frame and said door panel;

forming a flexible seal;

placing said door in an open position;

attaching said flexible seal to an edge of said door frame and coupling said flexible seal to said door panel such that said flexible seal covers a portion of said gap.

24. A method of assembling an aircraft door and door seal comprising steps of;

attaching a door panel to a door frame using a piano hinge such that said door frame surrounds said door panel with a gap between said door frame and said door panel;

forming a flexible seal;

placing said door in an open position;

attaching said flexible seal to said door frame and attaching said flexible seal to said door panel such that said flexible seal covers a portion of said gap wherein, said forming step includes the step of bonding a first edge of said flexible seal to a first rigid terminal block and;

said forming step includes the step of bonding a second edge of said flexible seal to a second rigid terminal block.

\* \* \* \* \*

UNITED STATES PATENT AND TRADEMARK OFFICE
CERTIFICATE OF CORRECTION

| | |
|---|---|
| PATENT NO. | : 6,877,695 B2 |
| APPLICATION NO. | : 10/318439 |
| DATED | : April 12, 2005 |
| INVENTOR(S) | : James V. Eveker and Roger K. Young |

It is certified that error appears in the above-identified patent and that said Letters Patent is hereby corrected as shown below:

Claim 1, Column 4, line 28 - 40 should read:

1. An aircraft door and seal combination comprising;
   a piano hinge attaching said aircraft door to a frame with a gap between said aircraft door and said frame when said aircraft door is in a closed position;
   a blade seal attached to an edge of said aircraft door;
   a first terminal block attached to said aircraft door adjacent to said piano hinge;
   a flexible seal bonded to said first terminal block;
   a second terminal block attached to said frame and said flexible seal bonded to said second terminal block such that said flexible seal covers a portion of said gap.

Claim 2, Column 4, line 41 - 42 should read:

2. The aircraft door and seal combination of claim 1 wherein;
   said flexible seal is made in part from silicon.

Claim 3, Column 4, line 44 - 49 should read:

3. The aircraft door and seal combination of claim 1, wherein;
   said blade seal covers a portion of said gap and wherein said blade seal covers a portion of said flexible seal adjacent to said piano hinge to form a continuous seal over said gap.

Claim 4, Column 4, line 50 - 52 should read:

4. The aircraft door and seal combination of claim 1, wherein said flexible seal is stretched in a generally flat orientation when said door is in said closed position.

UNITED STATES PATENT AND TRADEMARK OFFICE
CERTIFICATE OF CORRECTION

| | | |
|---|---|---|
| PATENT NO. | : 6,877,695 B2 | |
| APPLICATION NO. | : 10/318439 | |
| DATED | : April 12, 2005 | |
| INVENTOR(S) | : James V. Eveker and Roger K. Young | |

It is certified that error appears in the above-identified patent and that said Letters Patent is hereby corrected as shown below:

Claim 5, Column 4, line 53 - 56 should read:

5. The aircraft door and seal assembly of claim 4, wherein said door includes an open position and wherein said flexible seal flexes to a non-flat orientation when said door is in said open position.

Claim 10, Column 5, line 20 - 29 should read:

10. An aircraft door and frame combination comprising;
   a piano hinge attaching said aircraft door to said frame with a gap between said aircraft door and said frame when said aircraft door is in a closed position;
   a blade seal attached to a first edge of said aircraft door;
   a flexible seal bonded to a second edge of said door;
   said flexible seal also bonded to a portion of said frame such that said flexible seal covers a portion of said gap, said blade seal lying on one side of said aircraft door.

Claim 11, Column 5, line 30 - 41 should read:

11. An aircraft door and frame combination comprising;
   a piano hinge attaching said aircraft door to said frame with a gap between said aircraft door and said frame when said aircraft door is in a closed position;
   a blade seal attached to a first edge of said aircraft door;
   a flexible seal bonded to a second edge of said door;
   said flexible seal also bonded to a portion of said frame such that said flexible seal covers a portion of said gap,
   wherein said second edge of said door includes a terminal block and,
   wherein said flexible seal is bonded to said terminal block.

UNITED STATES PATENT AND TRADEMARK OFFICE
CERTIFICATE OF CORRECTION

PATENT NO. : 6,877,695 B2  
APPLICATION NO. : 10/318439  
DATED : April 12, 2005  
INVENTOR(S) : James V. Eveker and Roger K. Young It is certified that error appears in the above-identified patent and that said Letters Patent is hereby corrected as shown below:

Claim 12, Column 5, line 42 - 45 should read:

12. The aircraft door and frame combination of claim 11, wherein;
    said terminal block is a flat titanium plate attachable to said door.

Claim 13, Column 5, line 46 - 56 should read:

13. An aircraft door and frame combination comprising;
    a piano hinge attaching said aircraft door to said frame with a gap between said aircraft door and said frame when said aircraft door is in a closed position;
    a blade seal attached to a first edge of said aircraft door;
    a flexible seal bonded to a second edge of said door;
    said flexible seal also bonded to a portion of said frame such that said flexible seal covers a portion of said gap,
    wherein said portion of said frame includes an titanium terminal block to which the flexible seal is bonded.

Signed and Sealed this

Seventh Day of July, 2009

JOHN DOLL  
*Acting Director of the United States Patent and Trademark Office*